(12) United States Patent
Liu

(10) Patent No.: US 9,307,193 B2
(45) Date of Patent: Apr. 5, 2016

(54) COMMUNICATION METHOD AND ELECTRONIC DEVICE

(71) Applicant: Lenovo (Beijing) Co., Ltd., Beijing (CN)

(72) Inventor: Yunhui Liu, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 0 days.

(21) Appl. No.: 14/456,566

(22) Filed: Aug. 11, 2014

(65) Prior Publication Data

US 2015/0201159 A1    Jul. 16, 2015

(30) Foreign Application Priority Data

Jan. 13, 2014 (CN) .......................... 2014 1 0014071

(51) Int. Cl.
- *H04N 7/14* (2006.01)
- *H04L 29/06* (2006.01)
- *H04W 76/00* (2009.01)

(52) U.S. Cl.
CPC ............. *H04N 7/141* (2013.01); *H04L 65/00* (2013.01); *H04W 76/002* (2013.01)

(58) Field of Classification Search
CPC ...... H04N 7/142; H04L 65/00; H04W 76/002
USPC .............. 348/14.02; 370/433, 338; 455/41.1, 455/404.1, 413, 416, 431, 445, 552.1, 12.1, 455/41.2; 709/227
See application file for complete search history.

(56) References Cited

U.S. PATENT DOCUMENTS

| | | | | |
|---|---|---|---|---|
| 6,304,753 B1* | 10/2001 | Hartmaier | ............... | H04L 29/06 370/338 |
| 6,965,771 B2* | 11/2005 | Rossi | ................ | H04B 7/18508 340/945 |
| 7,408,948 B2* | 8/2008 | Lopponen | ............... | H04M 3/42 370/310 |
| 8,254,986 B2* | 8/2012 | Russell | ............. | H04W 36/0066 370/328 |
| 8,275,315 B2* | 9/2012 | Hardacker | .......... | H04M 1/7253 455/41.2 |
| 8,811,934 B2* | 8/2014 | Coutts | ................ | G08B 21/0415 379/37 |
| 9,008,579 B2* | 4/2015 | Mayer | ..................... | H04W 4/02 370/338 |
| 9,014,631 B2* | 4/2015 | Dua | .................. | G06F 17/30058 340/10.51 |
| 9,065,923 B2* | 6/2015 | Tomek | ............. | H04M 1/72519 |
| 2007/0197227 A1* | 8/2007 | Naqvi | .................... | H04M 7/123 455/445 |
| 2008/0205354 A1* | 8/2008 | Makela | ................. | H04W 92/18 370/338 |
| 2014/0274006 A1* | 9/2014 | Mutya | .................... | H04W 36/14 455/416 |
| 2014/0280982 A1* | 9/2014 | Patel | ................... | H04L 65/1006 709/227 |
| 2015/0201159 A1* | 7/2015 | Liu | ......................... | H04N 7/141 348/14.02 |

* cited by examiner

*Primary Examiner* — Gerald Gauthier
(74) *Attorney, Agent, or Firm* — Brinks Gilson & Lione; G. Peter Nichols

(57) ABSTRACT

The present invention relates to a communication method and an electronic device. The communication method is applied to a first electronic device and includes receiving a first type of a communication request from a second electronic device, and carrying out a first type of communication with the second electronic device via a first communication network in response to the communication request; when establishing the first type of communication with the second electronic device, automatically starting a second communication network for carrying out a second type of communication with the second electronic device; and carrying out the second type of communication with the second electronic device while carrying out the first type of communication with the second electronic device.

16 Claims, 2 Drawing Sheets

COMMUNICATION METHOD AND ELECTRONIC DEVICE

BACKGROUND

This application claims priority to Chinese Patent Application No. 201410014071.7 filed on Jan. 13, 2014, the entire contents of which are incorporated herein by reference.

The present disclosure relates to the field of electronic device, and more particularly to a communication method and an electronic device.

Mobile call goes through the course of voice call, video call, in which the pure voice call is still underway. Currently, an enhanced call function of video call brings about video call experience to users in addition to voice call communication, which greatly improves the users' call experience. However, in real life, people also have more call needs, such as file sharing, communicating about pictures, sharing contacts and so on, in addition to the needs of voice, video calls. Although there are many applications or functions that can also meet some of the needs, there is no communication enhancement method and experience close to calls and having good experience.

In addition, during users' call, a natural behavior of both parties in the call is being able to do what they want to do, like discussing a photograph. However, the existing network interactive applications and services require users to experience user registration, login, authentication, adding friends, finding friends, and other tedious interactive processes that increase users' using cost and reduce users' experience.

Therefore, it is desirable to provide a novel and improved communication method and electronic device, which is closely attached to call behaviors without requiring additional interaction operations of the users, thereby improve using experience of users.

SUMMARY

According to embodiments of the present disclosure, there is provided a communication method applied to a first electronic device, the method comprising:
receiving a first type of a communication request from a second electronic device, and carrying out a first type of communication with the second electronic device via a first communication network in response to the communication request;
when establishing the first type of communication with the second electronic device, automatically starting a second communication network for carrying out a second type of communication with the second electronic device; and
carrying out the second type of communication with the second electronic device while carrying out the first type of communication with the second electronic device.

Preferably, the first type of communication includes voice communication and video communication, and the second type of communication includes data service communication.

Preferably, the communication request includes identification information of the second electronic device, and
the method further comprises: after establishing the second communication network connection, identifying and establishing a user identifier used for the second type of communication according to the identification information.

Preferably, the communication method further comprises:
initiating a first application according to a first operation;
establishing a data channel through the first application and the corresponding first application in the second electronic device, to provide first service.

Preferably, the communication method further comprises:
after the first application is initiated, automatically determining that a user identifier of the second electronic device in the first application through the identification information.

Preferably, the communication method further comprises:
receiving a first type of a communication request from at least one third electronic device, and carrying out a first type of communication via the first communication network in response to the communication request, the communication request including identification information of the third electronic device;
automatically initiating a second communication network connection used for carrying out a second type of communication with the third electronic device; and
carrying out the second type of communication with the third electronic device via the network while carrying out the first type of communication.

Preferably, the communication method further comprises:
initiating the first application according to a first operation;
establishing a data channel through the first application and the corresponding first application in the second electronic device and the third electronic device, to provide first service.

Preferably, the electronic device comprises a first display unit and a second display unit, and the first display unit is used for displaying content associated with the first type of communication, and the second display unit is used for displaying content associated with the second type of communication.

According to another embodiment of the present disclosure, there is provided an electronic device, comprising:
a first communication module configured to receive a first type of a communication request from a second electronic device, and carry out a first type of communication with the second electronic device via a first communication network in response to the communication request;
a second communication module configured to, when establishing the first type of communication with the second electronic device, automatically start a second communication network used for carrying out a second type of communication with the second electronic device, and carry out the second type of communication with the second electronic device while carrying out the first type of communication with the second electronic device.

Preferably, the first type of communication includes voice communication and video communication, and the second type of communication includes data service communication.

Preferably, the communication request includes identification information of the second electronic device, and
the second communication module is further configured to: after establishing the second communication network connection, identify and establish a user identifier used for the second type of communication according to the identification information.

Preferably, the second communication module is further configured to:
enable a first application according to a first operation;
establish a data channel through the first application and the corresponding first application in the second electronic device, to provide first service.

Preferably, the second communication module is further configured to:
after the first application is initiated, automatically determine that a user identifier of the second electronic device in the first application through the identification information.

Preferably, the second communication module is further configured to:
receive a first type of a communication request from at least one third electronic device, and carry out a first type of communication via the first communication network in response to the communication request, the communication request including identification information of the third electronic device;

automatically enable a second communication network connection used for carrying out a second type of communication with the third electronic device; and carry out the second type of communication with the third electronic device via the network while carrying out the first type of communication.

Preferably, the second communication module is further configured to:

enable the first application according to a first operation;

establish a data channel through the first application and the corresponding first application in the second electronic device and the third electronic device, to provide first service.

Preferably, the electronic device further comprises:

a first display unit used for displaying content associated with the first type of communication; and a second display unit used for displaying content associated with the second type of communication.

Thus, according to the communication method and the electronic apparatus in the embodiments of the present disclosure, it is closely attached to the calling behavior without additional interactions of the users, thereby user experience is improved.

DETAILED DESCRIPTION

Hereinafter, a communication method according to an embodiment of the present disclosure will be described in detail with reference to the accompanying drawings.

The communication method according to a first embodiment of the present disclosure is applied to a first electronic device. Such electronic device may be any electronic device, it for example includes smart phone, tablet computer, personal computer, notebook computer, personal digital assistant etc., as long as the electronic device has a communication module.

Figure 1:
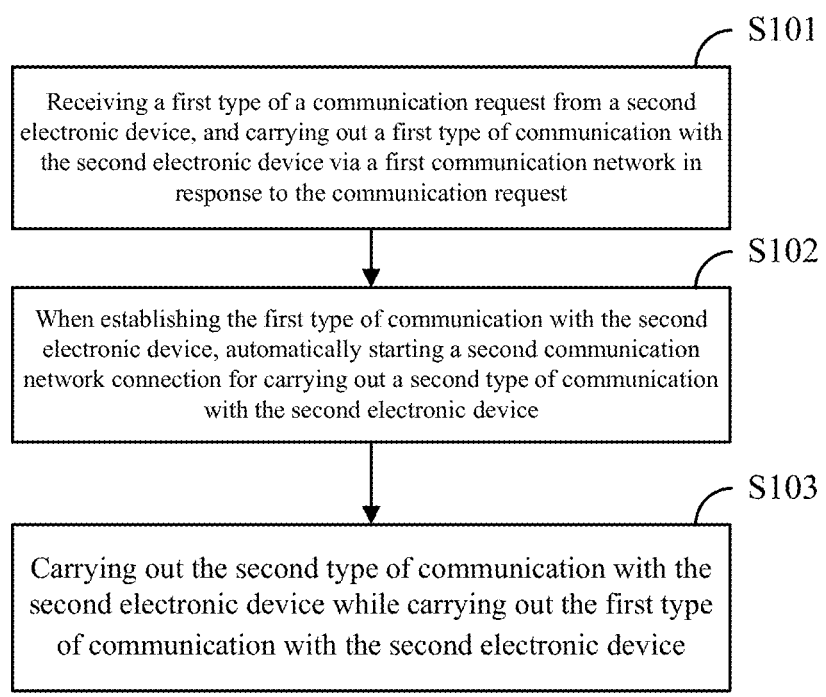
FIG. 1 is a flowchart illustrating a communication method according to a first embodiment according to the present disclosure.

As shown in FIG. 1, the communication method 100 comprises:

Step S101: receiving a first type of a communication request from a second electronic device, and carrying out a first type of communication with the second electronic device via a first communication network in response to the communication request;

Step S102: when establishing the first type of communication with the second electronic device, automatically starting a second communication network connection for carrying out a second type of communication with the second electronic device; and Step S103: carrying out the second type of communication with the second electronic device while carrying out the first type of communication with the second electronic device.

Specifically, in step S101, the first electronic device receives a first type of a communication request from a second electronic device, and carries out a first type of communication with the second electronic device via a first communication network in response to the communication request. In an embodiment, the first type of communication may include voice communication and video communication.

In step S101, the first electronic device receives a request for a voice call or a video call from the second electronic device, and starts a voice call or a video call with the second electronic device via a first communication network like 2G/3G/4G network and so on, in response to the request.

In step S102, when establishing the first type of communication with the second electronic device, a second communication network connection for carrying out a second type of communication with the second electronic device is automatically started. In an embodiment, the second type of communication may include data communication service.

That is, in the step S102, when the first electronic device and the second electronic device start a voice call or a video call, a second communication network connection for carrying out a second type of communication with the second electronic device is automatically started, for example, a network connection based on Internet/LAN/WLAN/WiFi.

It should be noted that, in this embodiment, the first communication network is mainly used for voice communication or video communication between the first electronic device and the second electronic devices, that is, the first communication network is mainly used for basic call needs. The second communication network is mainly used for data service between the first electronic device and the second electronic device, for example interaction functions between the first electronic device and the second electronic device like contacts sharing, interactive graffiti, interactive games, photo sharing etc., that is, the second communication network is mainly used for enhanced service needs besides the basic call needs.

Thereafter, in step S103, the second type of communication with the second electronic device is carried out while carrying out the first type of communication with the second electronic device.

In step S103, the users of the first electronic device and the second electronic device can carry out an additional data communication via the second communication network while carrying out a voice call or a video call via the first communication network.

In step S101, the communication request received by the first electronic device from the second electronic device may include identification information of the second electronic device, e.g., phone number of the second electronic device.

Thereafter, after establishing the second communication network connection with the second electronic device, a user identifier used for the second type of communication may be identified and established according to the identification information. For example, the first electronic device identifies the user identifier of the second electronic device based on the telephone number of the second electronic device, and takes the telephone number of the first electronic device as a user identifier of the first electronic device itself for the second type of communication.

Next, a communication method according to a first embodiment of the present disclosure will be described in detail with reference to FIG. 2.

Figure 2:
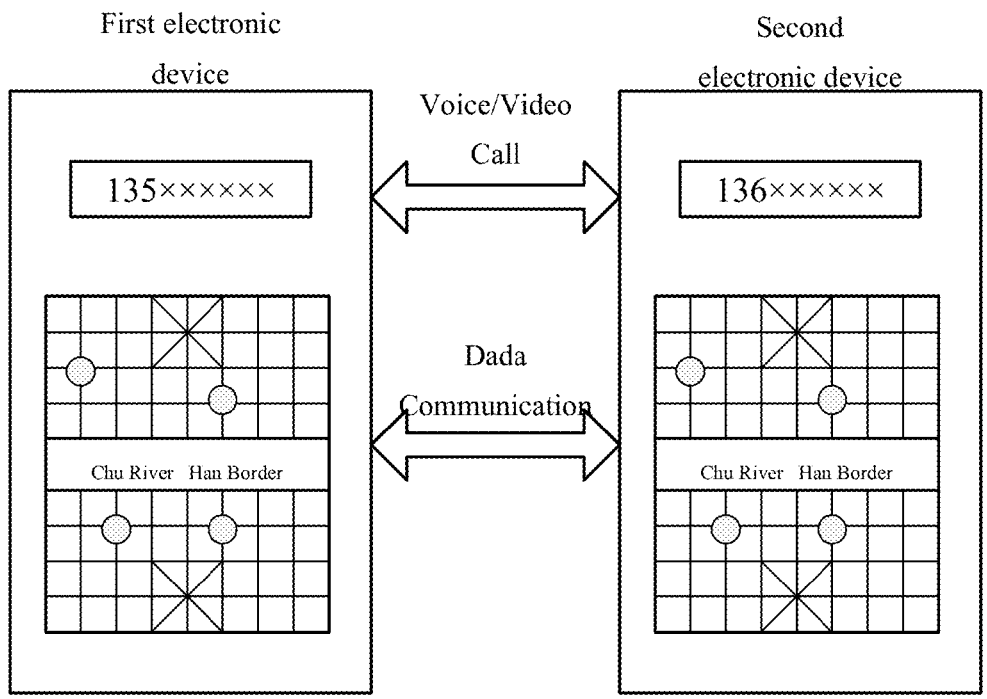
FIG. 2 is a diagram illustrating a usage scenario of a communication method according to a second embodiment of the present disclosure.

As shown in FIG. 2, after the first electronic device and the second electronic device start a voice/video call, a network connection used for data communication is automatically established.

Thereafter, the user of the first electronic device may enable a first application according to a first operation by the user. In this embodiment, it is assumed that the user starts a chess game. In this case, the user of the second electronic device may also start the same first application, i.e., the chess game same according to an operation of the user.

Next, a data channel is established through the first application and the corresponding first application in the second electronic device, to provide first service. In this embodiment, a data channel is established between the chess game in the first electronic device and the chess game in the second electronic device, so as to transmit data, so that the user of the first electronic device and the user of the second electronic device can chess together.

After the first application is initiated, a user identifier of the second electronic device in the first application automatically is determined through the identification information.

Specifically, after starting the chess game, the first electronic device may take its own telephone number as a user identifier, and the second electronic device may take its own telephone number as a user identifier. In this case, the user of the first electronic device can determine the username of the second electronic device in the chess game through the phone number of the second electronic device, and conveniently determine the user of the second electronic that is to chess together in the chess game, and begin to chess without going through user registration, login, authentication, adding friend, finding friend and other tedious interaction process.

It should be noted that only the chess game application is described above, but the present disclosure can be applied to any three-party interactive applications, as long as the applications adopt the above method, it is possible to achieve interaction activities of multi-users, and other network access actions and interactions like login, authenticating identity are no longer needed.

In another embodiment, the first electronic device may further receive a first type of a communication request from at least one third electronic device, and carry out a first type of communication via the first communication network in response to the communication request, the communication request including identification information of the third electronic device;

automatically enable a second communication network connection used for carrying out a second type of communication with the third electronic device; and carry out the second type of communication with the third electronic device via the network while carrying out the first type of communication.

In this embodiment, the first electronic device may receive a call request from a third electronic device and begin to make a call with the third electronic device while making a call with the second electronic device.

Similar to the above embodiment, a second communication network connection used for carrying out a second type of communication with the third electronic device is automatically initiated, and the second type of communication with the third electronic device is carried out via the network while carrying out the first type of communication.

Thereafter, the user of the first electronic device enables the first application according to a first operation; and establishes a data channel through the first application and the corresponding first application in the second electronic device and the third electronic device, to provide first service.

In this embodiment, the users of the first electronic device, the second electronic device and the third electronic device, for example, enable a picture sharing and interacting application. Therefore, a data path is established between the first electronic device, the second electronic device, and the third electronic device, so that the users of the first electronic device, the second user, and the third electronic device can share pictures and interact.

Specifically, after initiating a picture sharing and interacting application, the first electronic device takes its own telephone number as a user identifier, the second electronic device takes its own telephone number as a user identifier, and the third electronic device takes its own telephone number as a user identifier. Therefore, the user of the first electronic device can conveniently determine the users of the second electronic and the third electronic device that are to shared pictures and interact with in the picture sharing and interacting application, and begin to share and interact without going through user registration, login, authentication, adding friend, finding friend and other tedious interaction process.

In an embodiment, the electronic device comprises a first display unit and a second display unit, and the first display unit is used for displaying content associated with the first type of communication, and the second display unit is used for displaying content associated with the second type of communication.

In particular, the electronic device may have two display units. The first display unit may display content associated with voice/video calls, such as phone number of the second electronic device, a user identification of the second electronic device in an address book, and so on. The second display unit may display content associated with data communication, such as a graphical user interface of the first application, interaction data of the first electronic device and the second electronic device and/or the third electronic device, and so on.

In an embodiment, the first display unit and the second display unit may be two display units provided on the electronic device.

In another embodiment, the first display unit is a display unit provided on the electronic device, and the second display unit is a display region formed by projection of a light source on the electronic device.

In another embodiment, the electronic device may also have only one display unit. The display unit may be divided into a first display portion and a second display portion. The first display portion may display content associated with voice/video calls, such as phone number of the second electronic device, a user identification of the second electronic device in an address book, and so on. The second display portion may display content associated with data communication, such as a graphical user interface of the first application, interaction data of the first electronic device and the second electronic device and/or the third electronic device, and so on.

Thus, according to the communication method in the embodiments of the present disclosure, it is closely attached to the calling behaviors without additional interactions of the users, thereby user experience is improved.

Figure 3:
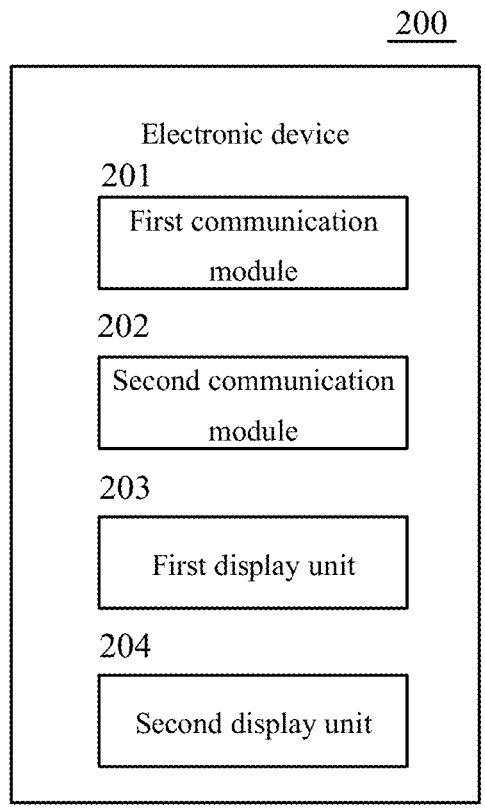
FIG. 3 is a block diagram illustrating a functional configuration of an electronic device according to the second embodiment of the present disclosure.

Hereinafter, an electronic device according to the second embodiment of the present disclosure will be described with reference to FIG. 3.

The electronic device 200 according to the second embodiment of the present disclosure comprises:

a first communication module 201 configured to receive a first type of a communication request from a second electronic device, and carry out a first type of communication with the second electronic device via a first communication network in response to the communication request;

a second communication module 202 configured to, when establishing the first type of communication with the second electronic device, automatically start a second communication network connection used for carrying out a second type of communication with the second electronic device, and carry out the second type of communication with the second electronic device while carrying out the first type of communication with the second electronic device.

Preferably, the first type of communication includes voice communication and video communication, and the second type of communication includes data service communication.

Preferably, the communication request includes identification information of the second electronic device, and the second communication module 202 is further configured to: after establishing the second communication network connection, identify and establish a user identifier used for the second type of communication according to the identification information.

The second communication module 202 is further configured to:

enable a first application according to a first operation;

establish a data channel through the first application and the corresponding first application in the second electronic device, to provide first service.

The second communication module 202 is further configured to:

after the first application is initiated, automatically determine a user identifier of the second electronic device in the first application through the identification information.

The second communication module 202 is further configured to:

receive a first type of a communication request from at least one third electronic device, and carry out a first type of communication via the first communication network in response to the communication request, the communication request including identification information of the third electronic device;

automatically enable a second communication network connection used for carrying out a second type of communication with the third electronic device; and carry out the second type of communication with the third electronic device via the network while carrying out the first type of communication.

The second communication module 202 is further configured to:

enable the first application according to a first operation;

establish a data channel through the first application and the corresponding first application in the second electronic device and the third electronic device, to provide first service.

The electronic device 200 further comprises:

a first display unit 203 used for displaying content associated with the first type of communication; and a second display unit 204 used for displaying content associated with the second type of communication.

Thus, the electronic device according to the embodiments of the present disclosure can be closely attached to the calling behavior without additional interactions of the users, thereby user experience is improved.

It should be noted that, when illustrating the electronic device according to the respective embodiments, only functional units thereof are shown, the connection relationships of the respective functional units are not described in detail, as will be appreciated by those skilled in the art, the respective functional units may be connected properly via bus, internal connection lines and so on, such connection is well known for those skilled in the art.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically Through the above description of the implementations, those skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for those with ordinary skill in the art, modifications may be made to the specific implementations and applications depending on the concepts of the present disclosure. To sum up, contents of this specification should not be construed as limiting the present disclosure.

The invention claimed is:

1. A communication method applied to a first electronic device, the method comprising:

receiving a first type of a communication request from a second electronic device, and carrying out a first type of communication with the second electronic device via a first communication network in response to the communication request, the first communication network being a mobile communication network;

when establishing the first type of communication with the second electronic device, automatically starting a second communication network connection used for carrying out a second type of communication with the second electronic device; and carrying out the second type of communication with the second electronic device via the second communication network while carrying out the first type of communication with the second electronic device, the second communication network being a wireless communication network, wherein, the first and second electronic device include mobile communication units carrying out the first type of communication via the mobile communication network, and wireless communication units carrying out the second type of communication via the wireless communication network.

2. The communication method according to claim 1, wherein the first type of communication includes voice communication and video communication, and the second type of communication includes data service communication.

3. The communication method according to claim 1, wherein the communication request includes identification information of the second electronic device, and the method further comprises, after establishing the second communication network connection, identifying and establishing a user identifier used for the second type of communication according to the identification information.

4. The communication method according to claim 3, further comprising initiating a first application according to a first operation and establishing a data channel through the first application and the corresponding first application in the second electronic device, to provide first service.

5. The communication method according to claim 4, further comprising, after the first application is initiated, automatically determining a user identifier of the second electronic device in the first application through the identification information.

6. The communication method according to claim 1, further comprising:
receiving a first type of a communication request from at least one third electronic device, and carrying out a first type of communication via the first communication network in response to the communication request, the communication request including identification information of the third electronic device;
automatically initiating a second communication network connection used for carrying out a second type of communication with the third electronic device; and
carrying out the second type of communication with the third electronic device via the network while carrying out the first type of communication.

7. The communication method according to claim 6, further comprising initiating the first application according to a first operation; and, establishing a data channel through the first application and the corresponding first application in the second electronic device and the third electronic device, to provide first service.

8. The communication method according to claim 1, wherein the electronic device comprises a first display unit and a second display unit, and the first display unit is used for displaying content associated with the first type of communication, and the second display unit is used for displaying content associated with the second type of communication.

9. An electronic device, comprising:
a first communication module configured to receive a first type of a communication request from a second electronic device, and carry out a first type of communication with the second electronic device via a first communication network in response to the communication request, the first communication network being a mobile communication network; and,
a second communication module configured to, when establishing the first type of communication with the second electronic device, automatically start a second communication network connection used for carrying out a second type of communication with the second electronic device, and carry out the second type of communication with the second electronic device via the second communication network while carrying out the first type of communication with the second electronic device, the second communication network being a wireless communication network,
wherein, the first and second electronic device include mobile communication units carrying out the first type of communication via the mobile communication network, and wireless communication units carrying out the second type of communication via the wireless communication network.

10. The electronic device according to claim 9, wherein the first type of communication includes voice communication and video communication, and the second type of communication includes data service communication.

11. The electronic device according to claim 9, the communication request includes identification information of the second electronic device, and the second communication module is further configured to, after establishing the second communication network connection, identify and establish a user identifier used for the second type of communication according to the identification information.

12. The electronic device according to claim 11, wherein the second communication module is further configured to enable a first application according to a first operation; and establish a data channel through the first application and the corresponding first application in the second electronic device, to provide first service.

13. The electronic device according to claim 12, wherein the second communication module is further configured to, after the first application is initiated, automatically determine a user identifier of the second electronic device in the first application through the identification information.

14. The electronic device according to claim 9, wherein the second communication module is further configured to:
receive a first type of a communication request from at least one third electronic device, and carry out a first type of communication via the first communication network in response to the communication request, the communication request including identification information of the third electronic device;
automatically enable a second communication network connection used for carrying out a second type of communication with the third electronic device; and
carry out the second type of communication with the third electronic device via the network while carrying out the first type of communication.

15. The electronic device according to claim 14, wherein the second communication module is further configured to enable the first application according to a first operation; and to establish a data channel through the first application and the corresponding first application in the second electronic device and the third electronic device, to provide first service.

16. The electronic device according to claim 9, wherein the electronic device further comprises a first display unit used for displaying content associated with the first type of communication; and a second display unit used for displaying content associated with the second type of communication.

* * * * *